(12) United States Patent
Merrey et al.

(10) Patent No.: US 8,385,561 B2
(45) Date of Patent: Feb. 26, 2013

(54) DIGITAL POWER LINK AUDIO DISTRIBUTION SYSTEM AND COMPONENTS THEREOF

(76) Inventors: F. Davis Merrey, Piedmont, OK (US); Gary Jones, Oklahoma City, OK (US)

( * ) Notice: Subject to any disclaimer, the term of this patent is extended or adjusted under 35 U.S.C. 154(b) by 1676 days.

(21) Appl. No.: 11/373,505

(22) Filed: Mar. 13, 2006

(65) Prior Publication Data

US 2007/0223722 A1 Sep. 27, 2007

(51) Int. Cl.
*H04B 3/00* (2006.01)
(52) U.S. Cl. ............................. 381/77; 381/120; 700/94
(58) Field of Classification Search .................... 381/77, 381/120, 98, 118, 28, 57–59, 333, 332, 107, 381/109, 123; 330/251, 254, 125 R, 277, 330/311; 700/94
See application file for complete search history.

(56) References Cited

U.S. PATENT DOCUMENTS

| | | | |
|---|---|---|---|
| 5,341,374 A | 8/1994 | Lewen et al. | 370/85.4 |
| 5,537,141 A | 7/1996 | Harper et al. | 348/12 |
| 5,838,393 A * | 11/1998 | Simpson et al. | 348/705 |
| 6,072,879 A * | 6/2000 | Ouchi et al. | 381/61 |
| 6,130,898 A | 10/2000 | Kostreski et al. | 370/522 |
| 6,686,530 B2 | 2/2004 | Juszkiewicz et al. | 84/600 |
| 6,931,134 B1 | 8/2005 | Waller, Jr. | 381/27 |
| 2002/0154783 A1 | 10/2002 | Fincham | 381/17 |
| 2002/0166125 A1 | 11/2002 | Fulmer, II | 725/78 |
| 2004/0220687 A1 | 11/2004 | Klotz et al. | 700/94 |
| 2004/0223622 A1* | 11/2004 | Lindemann et al. | 381/79 |
| 2004/0225388 A1 | 11/2004 | Zhang et al. | 700/94 |
| 2005/0027888 A1 | 2/2005 | Juszkiewicz | 709/250 |
| 2005/0131558 A1 | 6/2005 | Braithwaite et al. | 700/94 |

FOREIGN PATENT DOCUMENTS

EP 1517464 A2 * 3/2005
WO WO2005/022804 A2 3/2005

OTHER PUBLICATIONS

"Power Over Ethernet News," printout from website; http://www.poweroverethernet.com/, Mar. 13, 2006, pp. 1-3.
"IEEE802.3af Power Over Ethernet: A Radical New Technology," http://www.poweroverethernet.com/articles.php?article_id=52; pp. 1-10, 2003.

(Continued)

*Primary Examiner* — Xu Mei
*Assistant Examiner* — Lun-See Lao
(74) *Attorney, Agent, or Firm* — Greenberg Traurig, LLP

(57) ABSTRACT

An audio distribution system in one embodiment includes a master device, a powered speaker unit, and an expander device. The master device has an output port for receiving a cable carrying an electrical power signal along with a digital audio signal. The speaker unit includes a first port for receiving the electrical power signal and the digital audio power signal, and a second port for sending the signals. A digital-to-analog converter in the speaker unit converts the digital audio signal to an analog audio signal, and a speaker driver uses the signal to produce sound. The expander device is electrically connectable to the second port of the speaker unit for providing electrical power to one or more further speaker units. In another embodiment, the invention provides a master mixer device and a speaker unit. The master mixer device includes a digital signal processor for receiving and separately processing a speech channel having digital audio containing speech content and a music channel having digital audio containing music content. In an embodiment a powered speaker unit employing a class D amplifier for reproducing sound is further disclosed. A digital power link in port is provided in the powered speaker for receiving a cable carrying a digital audio signal and electrical power.

15 Claims, 4 Drawing Sheets

OTHER PUBLICATIONS

"Standards Project: IEEE 802.3 DTE Power via MDI Study Group," title, Proposed DC Power Requirements for Power via MDI, Sep. 31, 1999, pp. 1-9.

"What is Power-over-Ethernet (PoE)?," printout from website, http://www.hyperlinktech.com/web/what_is_poe.php; Mar. 13, 2006, pp. 1-3.

* cited by examiner

DIGITAL POWER LINK AUDIO DISTRIBUTION SYSTEM AND COMPONENTS THEREOF

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of audio distribution systems for distribution of audio announcements and/or music throughout buildings or outdoor spaces, and in particular to a digital power link audio distribution system wherein audio is distributed digitally and converted to analog at remote points in the system.

BACKGROUND OF THE INVENTION

Audio distribution systems are used in airports, convention halls, restaurants, other buildings, and outdoor spaces to distribute announcements and/or music. Such systems typically include a mixer/power supply which receives audio from audio sources and feeds a 70v or 100v audio signal to remote passive speakers throughout a building or other space.

Various disadvantages are associated with prior audio distribution systems. Installation of such systems is complex and subject to errors in wiring, which may result in faulty or out-of-phase connections at one or more of the remote speakers. Such systems are also subject to signal loss when long runs of speaker wire are utilized to connect speakers, particularly those at the far edge of the system. Wiring utilized for such systems may suffer from corrosion when the system is installed in an outdoor or otherwise humid environment.

Furthermore, prior audio distribution systems suffer from poor intelligibility of voice announcements which are broadcast over the system. Such intelligibility problems have been addressed by providing outboard or plug-in DSPs, but such solutions are complex to install and use.

OBJECTS AND SUMMARY OF THE INVENTION

It is therefore an object of the invention to provide an improved audio distribution system.

It is a further object of the invention to provide an audio distribution system which overcomes one or more limitations associated with the prior art.

In an embodiment, the invention provides an audio distribution system having a master device, a powered speaker unit, and an expander device. The master device includes an output port for receiving a cable which carries an electrical power signal from a power supply along with a digital audio signal. The speaker unit includes a first port electrically connectable to a cable for receiving the electrical power signal and the digital audio power signal, a second port electrically connectable to a cable for sending the electrical power signal and the digital audio signal, a digital-to-analog converter for converting the digital audio signal to an analog audio signal, and a speaker driver for using the analog audio signal to produce sound. The expander device is electrically connectable to the second port of the speaker unit for providing electrical power to one or more further speaker units.

In an embodiment, the invention provides a master mixer device and a speaker unit. The master mixer device includes a digital signal processor for receiving and separately processing a speech channel having digital audio containing speech content and a music channel having digital audio containing music content. A cable carries both an electrical power signal and a digital audio signal from a port on the master mixer device to a port on the speaker unit.

In an embodiment the invention provides a powered speaker unit employing a class D amplifier for reproducing sound. A digital power link in port is provided for receiving a cable carrying a digital audio signal and electrical power. A digital power amplifier uses pulse-width-modulated digital signals to switch an output power amplifier device, thereby generating an analog audio signal. A speaker driver receives the analog audio signal and reproduces sound in accordance therewith.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION OF THE PREFERRED EMBODIMENT

Reference will now be made in detail to the preferred embodiments of the present invention, examples of which are illustrated in the accompanying drawings.

Figure 1:
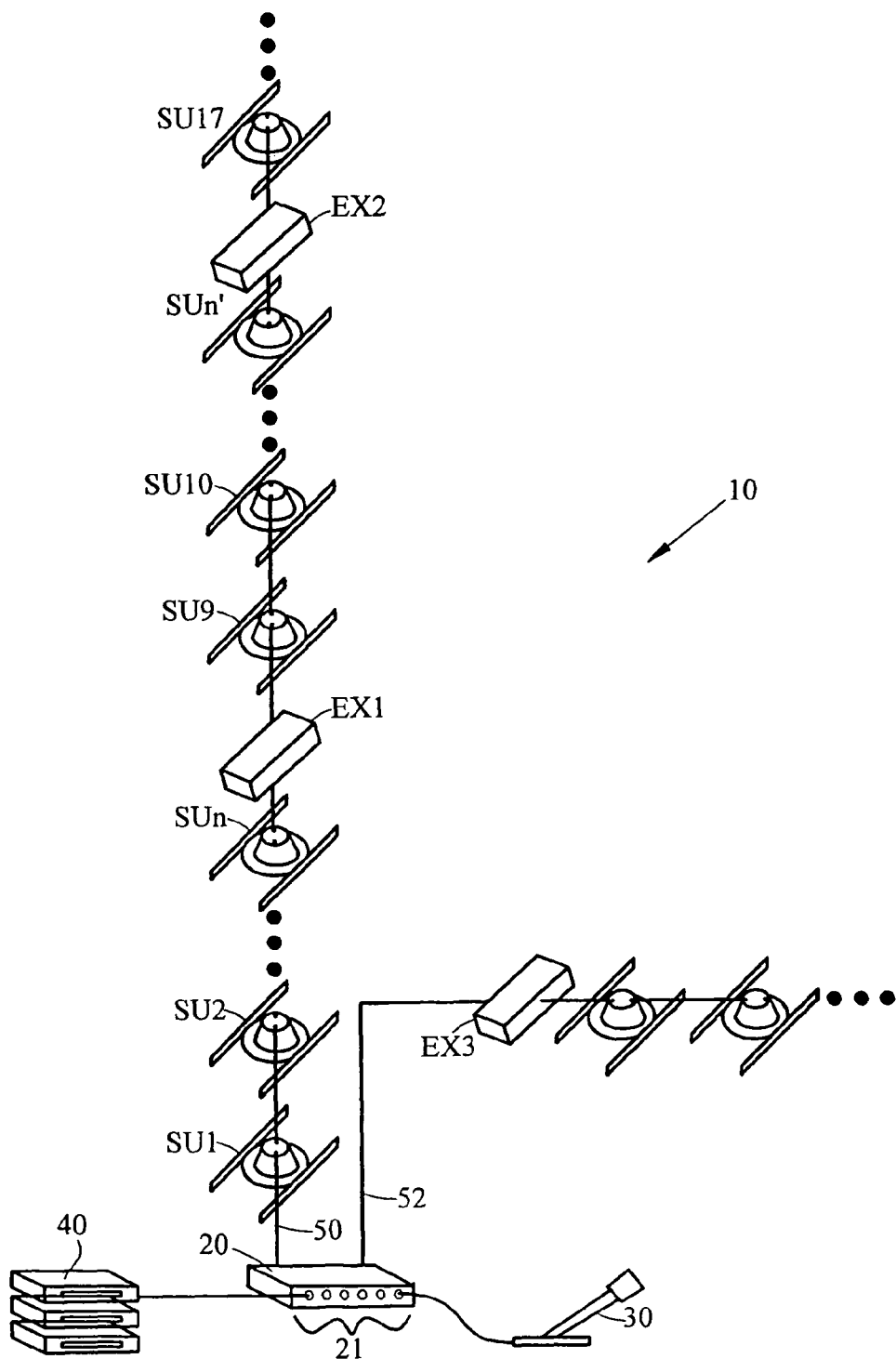
FIG. 1 shows a diagram illustrating an audio distribution system of the invention in one embodiment.

With reference to FIG. 1, an audio distribution system 10 in one embodiment includes a master mixer/power converter 20 which includes a series of audio inputs 21 for receiving audio signals from a microphone 30 and/or other audio sources 40. The audio sources 40 may include sources of music content such as, e.g., a satellite radio receiver, a CD player, a radio tuner, an internet radio receiver, a digital audio player, or the like. In this respect, the audio inputs 21 may be analog inputs, digital inputs, or a combination thereof. The audio sources may be separate from the master mixer/power converter 20, as shown in FIG. 1, or may be integrated therewith.

The master mixer/power converter 20 includes a digital power link out port 33 (FIG. 2) for outputting digital audio and power over a network cable 50, which may comprise, e.g., CAT5 or CAT5E cable or other similar twisted-pair network cabling terminated at each end with an RJ-45 connection. This cable and termination connections. Transmitting audio data in digital form across such twisted-pair cable provides resistance to radio-frequency interference over conventional speaker cables, and its RJ-45 connectors can be used to quickly connect the various components of the present system without the risk of improper wiring. The use of common networking cable with RJ-45 or similar terminations in the present system reduces the chance of connection failure and/or inadvertent disconnection and facilitates making connections between various components of the system by consolidating wiring into a single connector. One or more of the four twisted pairs of conductors within the network cable 50 may be used to carry the digital audio signal, and one or more of the remaining pairs may be used to carry power. The digital power link out port is discussed in further detail below with reference to FIG. 2.

With continuing reference to FIG. 1, the network cable 50 connects output port 33 (FIG. 2) of the master mixer/power converter 20 to speaker unit SU1. As will be seen in more detail below, speaker unit SU1 can be daisy chained with additional speaker units SU2-SUn using additional network cables. In an embodiment, each speaker unit comprises a DSP, a digital-to-analog converter, an audio power amplifier, a ceiling-mounted speaker, and suitable digital power link in and out jacks. One example of a suitable digital power link in and out jack is an RJ45 female jack, however, any suitable jack may be used. As described above, the network cable 50 connects the digital power link out jack on the master mixer/power converter 20 to a digital power link in jack in speaker unit SU1. A second network cable may connect the digital power link out jack in speaker unit SU1 to a digital power link in jack in speaker unit SU2. A third network cable may be used to connect the digital power link out jack in speaker unit SU2 to a digital power link in jack in speaker unit SU3, and so on until a maximum number of speaker units has been reached.

A maximum number of speakers may occur as a result of a number of factors, for example, but not by way of limitation, the amount of power consumed by the daisy-chained speakers may not provide enough power to operate another speaker. Another example, also intended to illustrate and not to limit the invention is that the length of cable between the speaker units is sufficiently large that the power or audio signal remaining is too weak to travel further.

When the maximum number of speaker units has been reached (or the maximum cable length would be exceeded by adding another speaker unit, the system can be expanded to include further speaker units by use of one or more expander power converters EX1, EX2 that serve to refresh the power and/or digital audio signals. Each expander power converter EX1, EX2, also includes digital power link in and out jacks. The digital power link in jack in the expander power converter EX1 connects via cable to the digital power link out jack in the last speaker unit in the chain, SUn, and the digital power link out jack in the expander power converter EX1 connects via cable to the digital power link in jack of the next speaker unit SU9 in the chain. This daisy chaining is continued until a maximum number of speaker units has again been reached, at which point a second expander power converter EX2 is connected at the end of the chain to allow further speaker units to be added.

In addition to the digital power link out port, which outputs both digital audio and power, the master mixer/power converter 20 may include one or more link out ports which output digital audio but do not provide power. The link out port may be connected via a network cable 52 to a remote expander power converter EX3, which outputs both digital audio and power to a further chain of speakers.

Figure 2:
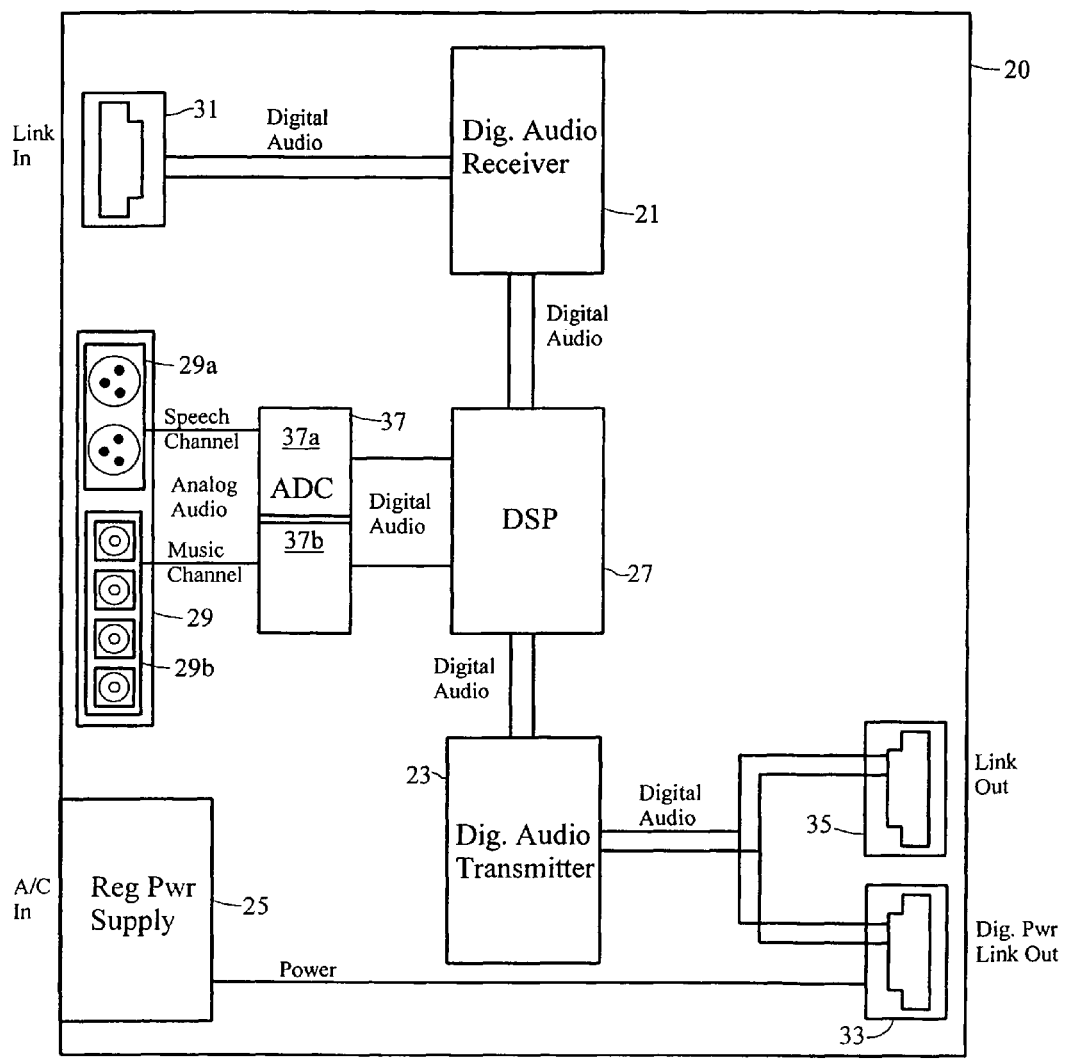
FIG. 2 shows a block diagram illustrating electrical aspects of a master mixer/power adapter in accordance with one embodiment of the invention.

FIG. 2 shows a block diagram illustrating selected electrical aspects and functionality of the master mixer/power converter 20. A digital audio receiver 21 and a digital audio transmitter 23 are provided for respectively receiving digital audio inputs and transmitting digital audio outputs. In an embodiment, the digital audio receiver 21 and digital audio transmitter 23 receive and transmit two channels of digital audio, shown in the figures as two lines, and designated herein as a speech channel and a music channel. As an example, and without limiting the scope of the invention, the digital audio receiver 21 and digital audio transmitter 23 may receive and transmit, using AES/EBU digital audio inputs and outputs as is know in the art. Analog audio inputs 29 are provided for receiving analog audio from sources such as a microphone and line level analog audio sources. In one embodiment, analog audio inputs 29a are designated as part of a speech channel, whereas analog audio inputs 29b are designated part of a music channel. There is, of course, nothing that limits the speech channel to speech, nor that prevents speech from being reproduced over the music channel. Similarly, the music channel may have any combination of inputs, and need not have any music at all. As will be discussed in more detail below, the speech channel and music channel may be handled differently within, or outside the master mixer/power converter 20, and it is thus it may be beneficial to provide the two channels.

A remote volume control input (not shown) may be provided for remotely controlling volume levels output by the speaker units. In an embodiment, one or more link in inputs 31 may be provided for connecting the master mixer/power converter 20 to other system components, including additional master mixer/power converters, in a daisy-chain manner to add functionality and/or provide additional inputs. One or more link in input ports 31 may also be provided for receiving audio input from digital sources rather than from other master mixer/power converters.

An analog-to-digital converter 37 converts the analog signals from analog inputs 29 to digital format. In an embodiment, the conversion provides at least two channels of digital audio output—a first channel, designed a "speech channel", may be used for speech from sources such as microphone 30 (FIG. 1), and a second channel, designated a "music channel", may be used for music or other audio content, from other audio sources 40 (FIG. 1). As discussed above, these channels are not limited to a specific type of content. A digital signal processor 27 receives the digital audio, including the speech channel and the music channel, from the analog-to-digital converter 37. The digital signal processor 27 may also receive two or more digital audio channels from the digital audio receiver 21. In an embodiment, the digital audio receiver 21 provides a speech channel and a music channel to the DSP 27.

The digital signal processor 27 applies digital processing, such as equalization and compression, to the digital audio signal. The digital signal processor 27 in one embodiment provides at least two channel processing. In an embodiment, the speech channel of the digital audio signal is processed in accordance with equalization and/or compression algorithms which are selected to improve the intelligibility of the content transmitted on the speech channel. For example, the digital signal processor may, when processing the speech channel, cause frequencies in the speech-typical mid band to be emphasized, and may cause frequencies in the low band, and/or frequencies outside of those associated with the human voice, to be attenuated. The digital signal processor may, when processing the speech channel, apply a relatively high level of compression to the speech channel to reduce the bandwidth used by the channel. In an embodiment, the digital signal processor allows the speech channel to be adjusted in volume level independently of the music channel. In an embodiment, the digital signal processor 27 may apply to the music channel different equalization and/or compression algorithms which are appropriate for non-speech audio such as commercial music. For example, without intending to limit the scope of the invention, low frequency response may be enhanced in the music channel to provide improved bass response. In an embodiment, no equalization or compression is applied to the music channel, while the speech channel is processed to improve intelligibility of voice content. In an embodiment, no equalization or compression is applied to the speech channel, while the music channel is processed to enhance music content. In an embodiment, the music channel is slightly or significantly attenuated when the speech channel is in use.

The output of the digital signal processor 27 is received by a digital audio transmitter 23, which formats the digital audio signal for output over a network cable via a digital power link out port 33 and/or a link out port 35. The digital power link out port 33 and the link out port 35 supply such digital audio signal to one or more pairs of twisted conductors in an ethernet cable or other network cable appropriate for transmission of digital signals. In an embodiment, the digital power link out port 33 and the link out port may comprise, e.g., RJ-45 female connectors.

In addition to the digital audio signal, the digital power link out port 33 supplies electrical power from the regulated power supply 25 over the connected network cable. The power is conducted from the regulated power supply to the digital power link out port 33 to which the network cable is connected. The power may be, e.g., at 48V DC, or other voltage appropriate to drive an audio power amplifier at the speaker unit(s) connected in the daisy chain manner as described above. In an embodiment, the regulated power supply 25 receives A/C power from an A/C in jack or plug, and sends DC power to pins of the digital power link out jack 33. While the power to the digital power link out jack 33 could be AC power, using AC power may cause interference that may prevents the digital audio signal from being transmitted in the same cable. In an embodiment, power is supplied to two or more pins of the digital power link out jack 33. In an embodiment where RJ45 jacks are used, power is supplied to four pins of the digital power link out jack 33, the speech channel is transmitted on two pins of the digital power link out jack 33 and the music channel is transmitted on two pins of the digital power link out jack 33. In an embodiment where RJ45 jacks are used, power is supplied to six pins of the digital power link out jack 33, and the speech and music channel are multiplexed on two pins of the digital power link out jack 33. The pairs of conductors carrying the power signal may all carry power at the same voltage, or may carry power at different voltages. Thus, for example, power may be supplied over the network cable to the audio power amplifier of the speaker units at a relatively high voltage sufficient to drive the amplifier, and may be supplied over a separate pair to the DSP of the speaker units at another, lower voltage.

In an embodiment, the regulated power supply further provides power to the various components and circuits of the master mixer/power converter 20, e.g., the digital audio receiver 21, the analog-to-digital converter 37, the DSP 27, and the digital audio transmitter 23.

In one embodiment within the scope of the invention, one or more of the pairs of conductors may be used to transmit control signals and/or data signals other than digital audio to the speaker units. For example, such pair or pairs may be used to transmit one or more of the following: volume control signals, equalization or signal processing settings, digital video, data from a computer's network interface card, or other signals.

In an embodiment within the scope of the invention, multiple digital power link out ports are provided to support further chains of speaker units, and each such chain may transmit content which is the same as or different than that of the digital power link out port 25.

Figure 3:
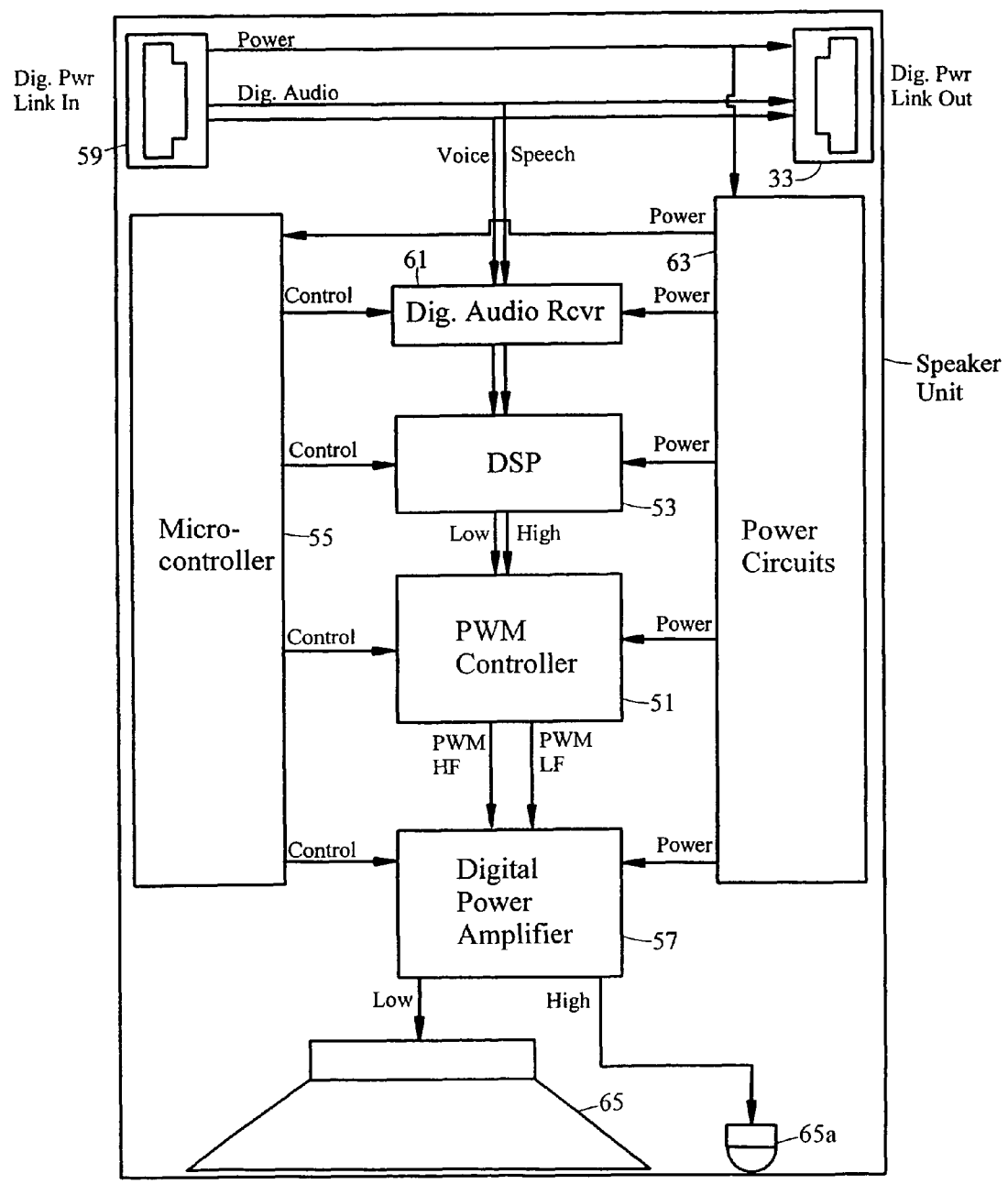
FIG. 3 shows a block diagram illustrating electrical aspects of a speaker unit in accordance with one embodiment of the invention.

FIG. 3 shows a block diagram illustrating electrical aspects of a speaker unit SU in accordance with one embodiment of the invention. A digital power link in port 59, which may comprise, e.g., an RJ-45 jack, receives digital audio and power signals from a preceding component in the chain. Such preceding component may be, e.g., the master mixer/power converter 20 (FIGS. 1 and 2), another speaker unit, or an expander/power converter EX1, EX2 or EX3 (FIG. 1).

The digital audio and power signals received at the digital power link in port 59 are both passed to the digital power link out port. In one embodiment, either of the digital power link ports can be used for the input of the cable carrying power and audio, and the other can be used as the output to daisy-chain the power and audio signal to additional speaker units. Thus, in an implementation of the invention, the two ports may be interchangeable. This simplifies the installation of the system, and greatly reduces the possibility that the speaker units will be mis-wired when installed. The power signal received at the digital power link in port 59 is also provided to the power circuits 63 for powering the internal electrical components of the speaker unit.

A digital audio receiver 61 receives the digital audio signal from the digital power link in port 59 and provides a digital audio signal to a digital signal processor 53. At this point, the digital audio signal in one embodiment includes both the speech channel and the music channel. In an embodiment, the digital signal processor 53 performs a digital sum of the speech channel and the music channel, and then a digital crossover function on the summed speech channel and music channel splitting it into high frequency and low frequency components. Thus, the digital audio signal which is output from the digital signal processor 53 contains two audio channels. This digital audio signal may be in pulse-code-modulated (PCM) form, or other digital audio format.

In an embodiment, the digital signal processor 53 may perform equalization on the speech channel and/or on the music channel prior to summing the channels. In an embodiment, the equalization may be configured for the speaker individually, and may be configured to accommodate acoustics or ambient noise local to the speaker. This type of flexibility permits a speaker situated above a marble floor, for example, to be equalized differently, on a per channel basis, than a speaker situated above a carpet or other acoustically absorptive surface.

A Pulse-Width-Modulation (PWM) controller 51 receives the two channels of digital audio from the digital signal processor 53 and converts each channel to a PWM signal comprising a train of pulses whose width varies in accordance with frequency of the encoded audio. Two PWM signals are thus output from the PWM controller 51. As shown in FIG. 3, these are designated PWM-LF (low frequencies) and PWM-HF (high frequencies). The PWM signals are used to drive a Class D digital power amplifier 57.

The Class D digital power amplifier 57 utilizes the PWM signals to switch an output power amplifier device on and off to provide an amplified analog signal. The output power amplifier device may be, e.g., a power MOSFET. In one embodiment, the Class D digital power amplifier 57 is a multi-channel amplifier operating at 20 watts per channel or more.

In an embodiment, the digital power amplifier may be set up for bi-amplification of the speech channel and the music channel. That is, the high-frequency components of those channels may be amplified separately from the low-frequency components. Each of the two separately amplified analog signals may be used to drive one or more speaker drivers 65, 65a. In an embodiment, the low frequency signal is used to drive a speaker driver 65, for example, but not by way of limitation, a 6.5" woofer with 20 oz. magnet, while the high frequency signal is used to drive a speaker driver 65a, for example, but not by way of limitation, a 1" horn-loaded silk dome tweeter. The speaker unit as shown in FIG. 3 may be provided in a single speaker enclosure or other unit. In one embodiment, the speaker unit is a ceiling mounted speaker, and the speaker drivers 65, 65a are downward-facing. In an embodiment, the speaker unit may be a wall-mounted speaker that is either recessed into a wall or surface-mounted to the wall, or even a free-standing speaker such as a floor-standing speaker or bookshelf type speaker. Although speaker drivers 65, 65a are shown separated, as will be apparent to one of skill in the art, the smaller speaker driver 65a may be situated within the perimeter of larger speaker driver 65.

In an embodiment (not shown), the digital signal processor 53 and PWM controller 51 output out a single signal comprising both the high and low frequency components, rather than outputting two separate signals. Amplifier 57 may thus amplify only the single signal, and outputs a single signal to a single full-range speaker (not shown.) Notably, the equalization of the speech and music channels can be achieved prior to the combination of the two into a single signal.

As will be appreciated by those of ordinary skill in the art, the speaker unit as described above can be used advantageously in audio systems other than the audio distribution system described hereinabove. For example, the speaker unit can be used in conjunction with a digital output of any audio source to provide a powered speaker which avoids signal loss, particularly where long cable runs are employed between the audio source and the speaker unit. The use of highly efficient class D amplification provides a powered speaker with very low power consumption which can be powered via cabling which is also used to transmit digital audio to the speaker.

Figure 4:
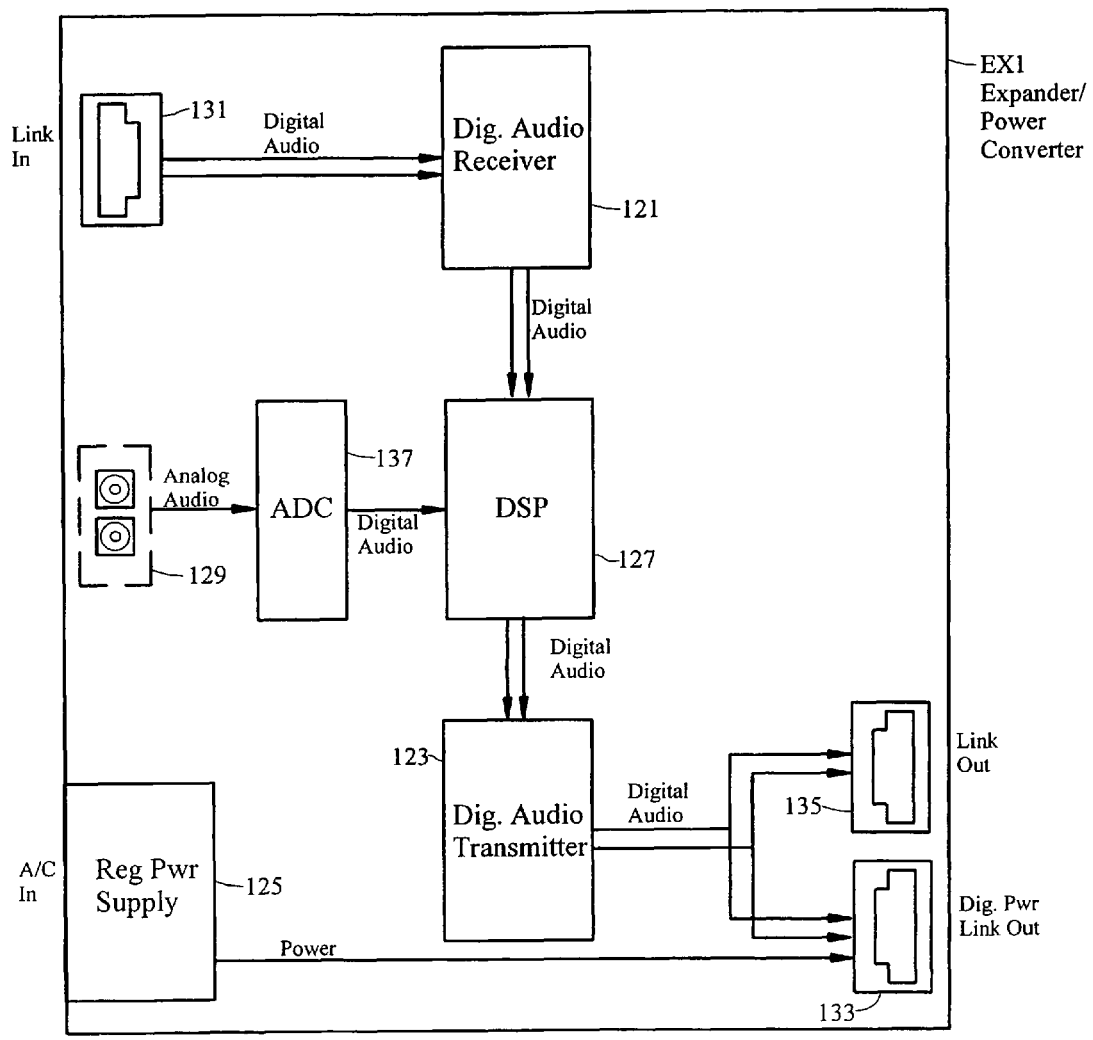
FIG. 4 shows a block diagram illustrating electrical aspects of an expander power converter in accordance with one embodiment of the invention.

FIG. 4 shows a block diagram illustrating various electrical aspects of the expander/power converter EX1 which is used to expand a daisy chain of speakers once the maximum number of speakers in the chain has been reached. The expander/power converter as shown may also be used to add remote speakers or daisy chains of speakers, as shown at element EX3 in FIG. 1, or may be used as an alternative to the master mixer/power converter where only a limited number of analog inputs and processing are required. A digital audio receiver 121 and a digital audio transmitter 123 are provided for respectively receiving digital audio inputs and transmitting digital audio outputs, such as AES/EBU digital audio inputs and outputs. Analog audio inputs 129, which may be, e.g., a mini stereo ⅛" TRS jack or a pair of RCA jacks, are provided for receiving analog audio from sources such as such as a DVD player, CD player, or the like. A link in input 131 may be provided for connecting the expander/power converter EX1 to the last speaker unit in the chain SUn (FIG. 1) or other upstream system components such as the master mixer/power converter.

With continued reference to FIG. 4, in one embodiment, an analog-to-digital converter 137 may be provided to convert the analog signals from analog inputs 129 to digital format. A digital signal processor 127 receives the digital audio from the analog-to-digital converter 137, and receives digital audio from the digital audio receiver 121. The digital signal processor 127 may apply digital processing, such as equalization and compression, to the digital audio signal in a manner similar to that described above with reference to the functions of the DSP in the master mixer/power converter 20 (FIG. 1). The analog inputs 129 may be treated as a speech channel or as a music channel by the digital signal processor 127. Note that an EX1 need not include analog inputs 129, nor ADC 137.

The output of the digital signal processor 127 is received by a digital audio transmitter 23, which formats the digital audio signal for output over a network cable via a digital power link out port 133 and/or a link out port 135. The digital power link out port 133 and the link out port 135 supply such digital audio signal to one or more pairs of twisted conductors in an ethernet cable or other network cable appropriate for transmission of digital signals. The digital power link out port 133 and the link out port may comprise, e.g., RJ-45 female connectors. In addition to the digital audio signal, the digital power link out port 133 supplies electrical power from the regulated power supply 125 over the connected network cable in much the same manner as is described above in connection with the digital power link out port 133 of the master mixer/power supply. In one embodiment, the regulated power supply 125 receives AC power from an A/C in jack or plug, and sends DC power to six pins of the digital power link out jack 133. This DC power signal is used to power further speaker units SU9 through SUn' (FIG. 1) downstream from the expander/power converter EX1.

Thus, an audio distribution system has been described which provides a plug-and-play architecture that facilitates installation and use of the system. While the invention has been particularly shown and described with reference to preferred embodiments thereof, it will be understood by those skilled in the art that various changes in form and details may be made therein without departing from the spirit and scope of the invention.

The embodiments of the invention in which an exclusive property or exclusive property or privilege is claimed are defined as follows:

1. A powered speaker unit employing a class D amplifier for reproducing sound, comprising:
    a digital power link in port for receiving a single cable carrying a digital audio signal and electrical power;
    a digital power amplifier powered by said electrical power received in said digital power link in port, said digital power amplifier using pulse-width-modulated digital signals to switch an output power amplifier device, thereby generating an analog audio signal; and,
    at least one speaker driver for reproducing sound based upon the analog audio signal;
    wherein the digital power link in port, the digital power amplifier, and the at least one speaker driver are integrated into a powered speaker unit.

2. The powered speaker unit in accordance with claim 1, further comprising a digital power link out port for sending digital audio and power over a second cable.

3. The powered speaker unit in accordance with claim 1, further comprising a pulse-width-modulation controller for converting digital audio signals to pulse-width-modulated digital signals.

4. The powered speaker unit in accordance with claim 3, wherein the pulse-width-modulation controller comprises a controller for converting pulse-code-modulated digital audio signals to pulse-width-modulated digital audio signals.

5. A powered speaker unit employing a class D amplifier for reproducing sound, comprising:
    A digital power link in port for receiving a cable carrying a first digital audio signal and electrical power;
    a link out port for conducting a second digital audio signal;
    a digital power amplifier powered by said electrical power received in said digital power link in port, said digital power amplifier using pulse-width-modulated digital signals to switch an output power amplifier, thereby generating at least one analog audio signal; and, at least one speaker driver for receiving the analog audio signal and reproducing sound in accordance therewith;

wherein the link in port, the link out port, the digital power amplifier, and the at least one speaker driver are integrated into a powered speaker unit.

6. The powered speaker unit in accordance with claim 5, wherein the first digital audio signal and the second digital audio signal are the same signal.

7. The powered speaker unit in accordance with claim 5, wherein the at least one speaker driver comprises first and second speaker drivers, the first speaker driver being adapted to reproduce sound in a first frequency range and the second speaker driver being adapted to reproduce sound in a second frequency range.

8. The powered speaker unit in accordance with claim 7, wherein the first speaker driver is a woofer and the second speaker driver is a tweeter.

9. The powered speaker unit in accordance with claim 5, wherein the digital power amplifier includes a high frequency amplification channel and a low frequency amplification channel.

10. The powered speaker unit in accordance with claim 5, wherein the at least one analog audio signal comprises a high-frequency analog audio signal and a low-frequency analog audio signal.

11. The powered speaker unit in accordance with claim 10, wherein the at least one speaker driver comprises a first speaker driver configured to receive the high-frequency analog audio signal and second speaker driver configured to receive the low-frequency analog audio signal.

12. The powered speaker unit in accordance with claim 11, wherein the first speaker driver configured to receive the high-frequency analog audio signal comprises a tweeter and the second speaker driver configured to receive the low-frequency analog audio signal comprises a woofer.

13. The powered speaker unit in accordance with claim 5, further comprising a pulse-width-modulation controller for converting digital audio signals to pulse-width-modulated digital signals.

14. The powered speaker unit in accordance with claim 13, wherein the pulse-width-modulation controller comprises a controller for converting pulse-code-modulated digital audio signals to pulse-width-modulated digital audio signals.

15. The powered speaker unit in accordance with claim 5, further comprising a digital signal processor for receiving and processing digital audio and for providing at least one processed digital audio signal to the digital power amplifier.

* * * * *